United States Patent
Zhao (10) Patent No.: US 12,342,397 B2
(45) Date of Patent: Jun. 24, 2025

(54) DIRECT CONNECTION COMMUNICATION METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 582 days.

(21) Appl. No.: 17/627,624

(22) PCT Filed: Jul. 23, 2019

(86) PCT No.: PCT/CN2019/097196
§ 371 (c)(1),
(2) Date: Jan. 14, 2022

(87) PCT Pub. No.: WO2021/012174
PCT Pub. Date: Jan. 28, 2021

(65) Prior Publication Data
US 2022/0264673 A1    Aug. 18, 2022

(51) Int. Cl.
H04W 76/14    (2018.01)
H04L 27/26    (2006.01)
H04W 72/044   (2023.01)
H04W 72/23    (2023.01)

(52) U.S. Cl.
CPC ....... *H04W 76/14* (2018.02); *H04L 27/26025* (2021.01); *H04W 72/044* (2013.01); *H04W 72/23* (2023.01)

(58) Field of Classification Search
CPC ... H04W 76/14; H04W 72/23; H04W 72/044; H04L 27/26025
See application file for complete search history.

(56) References Cited

U.S. PATENT DOCUMENTS

| | | |
|---|---|---|
| 2019/0059093 A1 | 2/2019 | Cheng et al. |
| 2019/0104543 A1 | 4/2019 | Park |
| 2019/0149305 A1 | 5/2019 | Zhou et al. |
| 2019/0165984 A1 | 5/2019 | Shapin et al. |
| 2021/0014893 A1* | 1/2021 | Park ............... H04B 17/318 |
| 2021/0028912 A1* | 1/2021 | Xu ................. H04L 5/0098 |

FOREIGN PATENT DOCUMENTS

| | | |
|---|---|---|
| CN | 101155399 A | 4/2008 |
| CN | 102957500 A | 3/2013 |

(Continued)

OTHER PUBLICATIONS

International Search Report of PCT/CN2019/097196 dated Apr. 21, 2020 with English translation, (4p).

(Continued)

*Primary Examiner* — Duc C Ho
(74) *Attorney, Agent, or Firm* — Arch & Lake LLP; Hao Tan; Shen Wang (57) ABSTRACT

The present disclosure provides a direct connection communication method and apparatus. The method comprises: determining a direct connection communication Bandwidth Part (BWP) set, the direct connection communication BWP set at least comprising a first direct connection communication BWP and a second direct connection communication BWP; and performing direct connection communication by using the direct connection communication BWP set.

15 Claims, 7 Drawing Sheets determining a direct connection communication BWP set — 101 performing direct connection communication by using the direct connection communication BWP set — 102

(56) References Cited

FOREIGN PATENT DOCUMENTS

| | | | | |
|---|---|---|---|---|
| CN | 107889253 A | 4/2018 | | |
| CN | 108496385 A | 9/2018 | | |
| CN | 109496454 A | 3/2019 | | |
| CN | 109496455 A | 3/2019 | | |
| CN | 109496457 A | 3/2019 | | |
| CN | 109561472 A | 4/2019 | | |
| CN | 109561489 A | 4/2019 | | |
| CN | 109565430 A | 4/2019 | | |
| CN | 109586881 A | * 4/2019 | ............. | H04L 1/001 |
| CN | 109588058 A | 4/2019 | | |
| CN | 109644358 A | 4/2019 | | |
| CN | 109729590 A | 5/2019 | | |
| CN | 109803354 A | 5/2019 | | |
| CN | 109906569 A | 6/2019 | | |
| CN | 109923919 A | 6/2019 | | |
| CN | 109982431 A | 7/2019 | | |
| CN | 109995497 A | 7/2019 | | |
| WO | 2018128469 A1 | 7/2018 | | |
| WO | 2019088676 A1 | 5/2019 | | |
| WO | 2019104116 A1 | 5/2019 | | |

OTHER PUBLICATIONS

Huawei, "BWP Operation for V2X Sidelink", Discussion and Decision, 3GPP TSG RAN WG1 Meeting #96bis, R1-1904690, Xi'an, China, Apr. 8-12, 2019, (6p).

First Office Action issued to Chinese Application No. 201980001482.3 dated Mar. 26, 2021 with English translation, (20p).
Second Office Action issued to Chinese Application No. 201980001482.3 dated Nov. 4, 2021 with English translation, (25p).
Mediatek, "Summary of Bandwidth Part Related Draft CRs", 3GPP TSG RAN WG1 Meeting #96, R1-1903391, Athens, Greece, Feb. 25-Mar. 1, 2018, (9p).
Mediatek, "Draft CR on Simultaneous Active BWP Switchings Within a Cell or Across Cells", 3GPP TSG RAN WG1 Meeting #95, R1-1814039, Spokane, WA, Nov. 12-16, 2018, (4p).
Mediatek, "Draft CR on Simultaneous Active BWP Switchings Within a Cell or Across Cells", 3GPP TSG RAN WG1 Meeting #95, R1-1814239, Spokane, WA, Nov. 12-16, 2018, (5p).
Notice of Allowance issued to Chinese Application No. 201980001482.3 dated Apr. 12, 2022, (6p).
Sun Shaohui et al., "Overview on the Progress of Design and Standardization of the Fifth Generation of Mobile Communications Systems", Journal of Beijing University of Posts and Telecommunications dated Nov. 20, 2018, with English abstract, (19p).
Du Ying et al., "Review of 5G Mobile Communication Technology Standard", Telecommunications Science dated Aug. 20, 2018 with English abstract, (9p).
Huang Chenheng, "Review on Physical Layer Key Technology of 3GPP 5G NR", Mobile Communications dated Oct. 15, 2018 with English abstract, (9p).

* cited by examiner

DIRECT CONNECTION COMMUNICATION METHOD AND APPARATUS

CROSS-REFERENCE TO RELATED APPLICATION

This application is the U.S. national phase of PCT Application No. PCT/CN2019/097196, filed on Jul. 23, 2019, the content of which is incorporated herein by reference in its entirety for all purposes.

TECHNICAL FIELD

The present disclosure relates to the field of communication, and in particular to a direct connection communication method and apparatus.

BACKGROUND

A NR (New Radio, new air interface) system has introduced BWP (Bandwidth Part) in the uplink and downlink design. A BWP refers to the continuous frequency domain RB (Resource Block) at a given carrier frequency and a given subcarrier interval. In NR uplink and downlink communication, BWP is configured for each device, and is divided into sending BWP and receiving BWP. On a carrier frequency, each device can be configured with a plurality of sending and receiving BWPs, but only one of the BWPs can be activated at one moment, and dynamic or semi-static BWP switching can be performed according to the downlink signaling instructions at the base station side. The device only needs to monitor the downlink control signaling in the activated BWP, and can only perform uplink transmission in the activated BWP.

In order to ensure that data can be sent and received among the same arbitrary user and the same BWP is used to send and receive data, each IoV (Internet of Vehicle) user can only be configured with one direct connection communication BWP, and it is assumed that all IoV user devices are configured with the same BWP.

SUMMARY

The examples of the present disclosure provide a direct connection communication method and apparatus.

According to a first aspect of the present disclosure, there is provided a direct connection communication method, applied to a direct connection communication device and including: determining a direct connection communication Bandwidth Part (BWP) set, wherein the direct connection communication BWP set at least includes a first direct connection communication BWP and a second direct connection communication BWP; and performing direct connection communication by using the direct connection communication BWP set.

According to a second aspect of the present disclosure, there is provided a direct connection communication method, applied to a base station and including: sending a downlink control signaling to a direct connection communication device, and the direct connection communication device determining, according to the downlink control signaling, a first direct connection communication BWP and/or a second direct connection communication BWP in a direct connection communication BWP set for direct connection communication.

According to a third aspect of the present disclosure, there is provided a direct connection communication apparatus, applied to a direct connection communication device and including: a processor; and a memory for storing instructions executable by the processor, wherein, the processor is configured to: determine a direct connection communication Bandwidth Part (BWP) set, wherein the direct connection communication BWP set at least includes a first direct connection communication BWP and a second direct connection communication BWP; and perform direct connection communication by using the direct connection communication BWP set.

It should be noted that the above general description and the following detailed description are merely exemplary and explanatory and should not be construed as limiting of the present disclosure.

BRIEF DESCRIPTION OF THE DRAWINGS

The drawings herein are incorporated into the specification and constitute a part of the specification, show examples in accordance with the present disclosure, and are used to explain the principle of the present disclosure together with the specification.

DETAILED DESCRIPTION

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of apparatuses and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used in this disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "at the time of" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The following first introduces the direct connection communication method provided by the example of the present disclosure from the direct connection communication device side.

Figure 1:
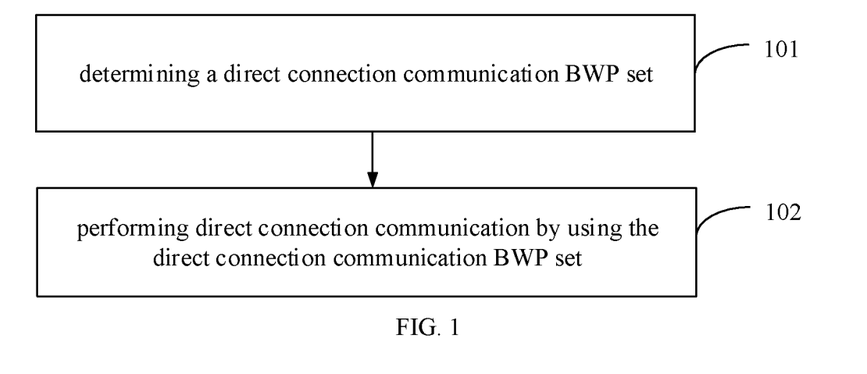
FIG. 1 is a schematic flowchart of a direct connection communication method according to one or more examples of the present disclosure.

Referring to FIG. 1, FIG. 1 is a schematic flowchart of a direct connection communication method according to an example. The method can be applied to a direct connection communication device. Optionally, the direct connection communication device may be a vehicle-mounted device, a handheld terminal, a smart watch, or the like. The method may include following steps.

In step 101, a direct connection communication Bandwidth Part (BWP) set is determined.

The direct connection communication BWP set at least includes a first direct connection communication BWP and a second direct connection communication BWP.

In the example of the present disclosure, the direct connection communication device may dynamically determine the direct connection communication BWP set based on the instruction of the base station, or may also determine the direct connection communication BWP set according to the pre-configuration.

Optionally, the first direct connection communication BWP and the second direct connection communication BWP can be determined dynamically according to the instruction of the base station; or the first direct connection communication BWP and the second direct connection communication BWP can be determined according to the pre-configuration; or the first direct connection communication BWP can be determined dynamically according to the instruction of the base station, and at the same time, the second direct connection communication BWP can be determined according to the pre-configuration; or the second direct connection communication BWP can be dynamically determined according to the instruction of the base station, and at the same time, the first direct connection communication BWP can be determined according to the pre-configuration, which is not limited by the present disclosure.

In step 102, direct connection communication is performed by using the direct connection communication BWP set.

In this step, after determining the direct connection communication BWP set, the direct connection communication device can use the direct connection communication BWP set for direct connection communication.

In the above-mentioned example, the direct connection communication device can determine the direct connection communication BWP set. The direct connection communication BWP set at least includes the first direct connection communication BWP and the second direct connection communication BWP. The direct connection communication device can use the direct connection communication BWP set for direct connection communication. In the examples of the present disclosure, the direct connection communication device can use the direct connection communication BWP set for direct connection communication, which improves the flexibility of direct connection communication.

Figure 2:
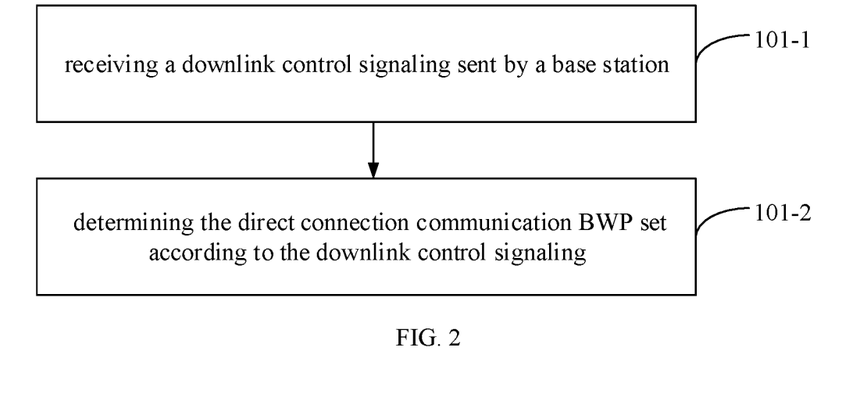
FIG. 2 is another schematic flowchart of a direct connection communication method according to one or more examples of the present disclosure.

In an example, the direct connection communication device may dynamically determine the first direct connection communication BWP and/or the second direct connection communication BWP in the direct connection communication BWP set based on the instruction of the base station. Referring to FIG. 2, FIG. 2 is another schematic flowchart of a direct connection communication method according to the example shown in FIG. 1. The step 101 may include following steps.

In step 101-1, the downlink control signaling sent by the base station is received.

In this step, the base station can instruct the configuration corresponding to the first direct connection communication BWP and the second direct connection communication BWP, or the second direct connection communication BWP, or the first direct connection communication BWP, through the downlink control signaling, and the direct connection communication device receives downlink control signaling according to the related technology.

In step 101-2, the direct connection communication BWP set is determined according to the downlink control signaling.

In this step, after receiving the downlink control signaling, the direct connection communication device may determine at least one of the first direct connection communication BWP and the second direct connection communication BWP according to the indication of the downlink control signaling.

In the above example, the direct connection communication device can receive the downlink control signaling sent by the base station, thereby determining the direct connection communication BWP set according to the downlink control signaling, so that the base station can dynamically configure the direct connection communication BWP set for the direct connection communication device.

Figure 3:
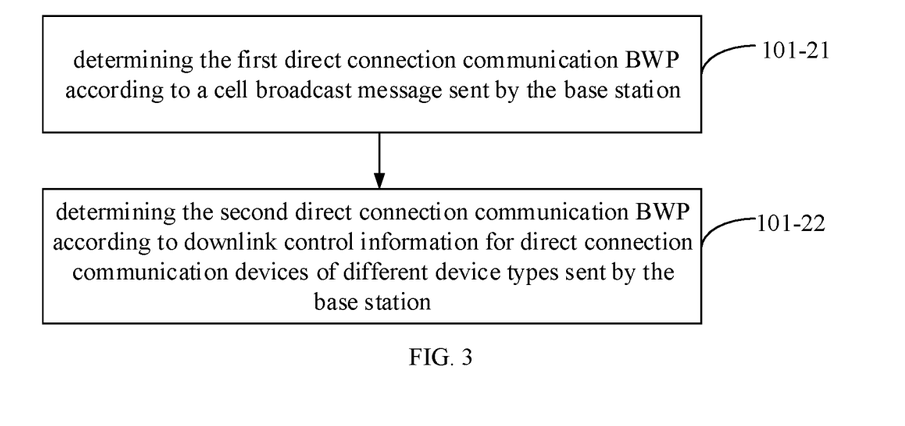
FIG. 3 is another schematic flowchart of a direct connection communication method according to one or more examples of the present disclosure.

In an example, referring to FIG. 3, FIG. 3 is another flowchart of a direct connection communication method according to the example shown in FIG. 2. The step 101-2 may include following steps.

In step 101-21, the first direct connection communication BWP is determined according to a cell broadcast message sent by the base station.

In the example of the present disclosure, the base station may indicate different direct connection communication BWPs through different downlink control signaling. The base station may indicate the configuration information of the first direct connection communication BWP through the cell broadcast message that all direct connection communication devices need to receive. The direct connection communication device can determine the first direct connection communication BWP according to the cell broadcast message.

In step 101-22, the second direct connection communication BWP is determined according to downlink control information for direct connection communication devices of different device types sent by the base station.

In this step, the base station sends corresponding downlink control information for direct connection communication devices of different device types. The downlink control information indicates the second direct connection communication BWP corresponding to the direct connection communication devices of different device types. After receiving the downlink control information, the direct connection communication device can determine the second direct connection communication BWP corresponding to itself according to the downlink control information.

In the foregoing example, the direct connection communication device may determine the first direct connection communication BWP in the direct connection communication set according to the cell broadcast message sent by the base station, and may also determine the second direct connection communication BWP in the direct connection communication set according to the downlink control information for the direct connection communication devices of different device types sent by the base station, which is easy to implement and has high availability.

Figure 4:
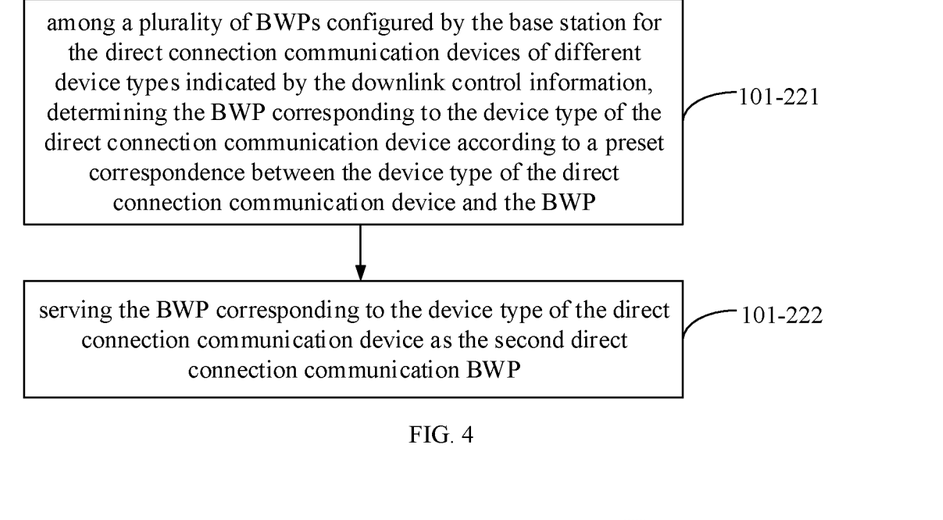
FIG. 4 is another schematic flowchart of a direct connection communication method according to one or more examples of the present disclosure.

In an example, referring to FIG. 4, FIG. 4 is another flowchart of a direct connection communication method according to the example shown in FIG. 3. The step 101-22 may include following steps.

In step 101-221, among a plurality of BWPs configured by the base station for the direct connection communication devices of different device types indicated by the downlink control information, the BWP corresponding to the device type of the direct connection communication device is determined according to a preset correspondence between the device type of the direct connection communication device and the BWP.

In this step, the base station can configure a plurality of BWPs for direct connection communication devices of different device types through downlink control information. Among the plurality of BWPs configured by the base station, the direct connection communication device may determine the BWP corresponding to the device type of the direct connection communication device according to a preset correspondence between the device type of the direct connection communication device and the BWP.

For example, in the downlink control information sent by the base station, a plurality of BWPs are configured for direct connection communication devices of different device types, and it is assumed that the plurality of BWPs include BWP1 and BWP2. The preset correspondence between the device type of the direct connection communication device and the BWP is that the first device type with low energy consumption and low cost corresponds to the first BWP indicated by the downlink control information, and the second device type with big data rate and low latency corresponds to the second BWP indicated by the downlink control information.

When the device type of the direct connection communication device is the first device type, the corresponding BWP is BWP1, and when the device type of the direct connection communication device is the second device type, the corresponding BWP is BWP2.

In step 101-222, the BWP corresponding to the device type of the direct connection communication device is served as the second direct connection communication BWP.

For example, if the BWP corresponding to the device type of the direct connection communication device is BWP1, the direct connection communication device directly uses BWP1 as the second direct connection communication BWP.

In the above-mentioned example, the direct connection communication device may determine the BWP corresponding to the device type of the direct connection communication device among the plurality of BWPs configured by the base station for direct connection communication devices of different device types, according to the preset correspondence between the device type of the direct connection communication device and the BWP, and further, serve the BWP corresponding to the device type of the direct connection communication device as the second direct connection communication BWP, which has high availability.

In an example, the direct connection communication device may further determine the first direct connection communication BWP and/or the second direct connection communication BWP in the direct connection communication BWP set based on the pre-configuration. Correspondingly, the step 101 may include following step.

In step 101-3, the first direct connection communication BWP and/or the second direct connection communication BWP is determined according to the BWP pre-configured for the direct connection communication device.

In the example of the present disclosure, the first direct connection communication BWP, or the second direct connection communication BWP, or the first direct connection communication BWP and the second direct connection communication BWP in the direct connection communication BWP set of the direct connection communication device can be determined according to the BWP pre-configured for the direct connection communication device in the protocol.

Optionally, the BWP pre-configured to the direct connection communication device may clearly indicate the BWP belonging to the first direct connection BWP and the second direct connection BWP respectively, and the BWP preconfigured to the direct connection communication device may also only indicate the BWP used by the direct connection communication device to send the discovery signal or the paging signal, and the direct connection communication device uses the BWP for sending the device discovery signal or the paging signal as the first direct connection communication BWP, and other BWP as the second direct connection communication BWP.

Among them, the device discovery signal is used to broadcast the device identification and/or device type of the direct connection communication device itself, and the paging signal is used to page other direct connection communication devices. The paging signal may also include the device identification and/or device type of the direct connection communication device itself.

Figure 5:
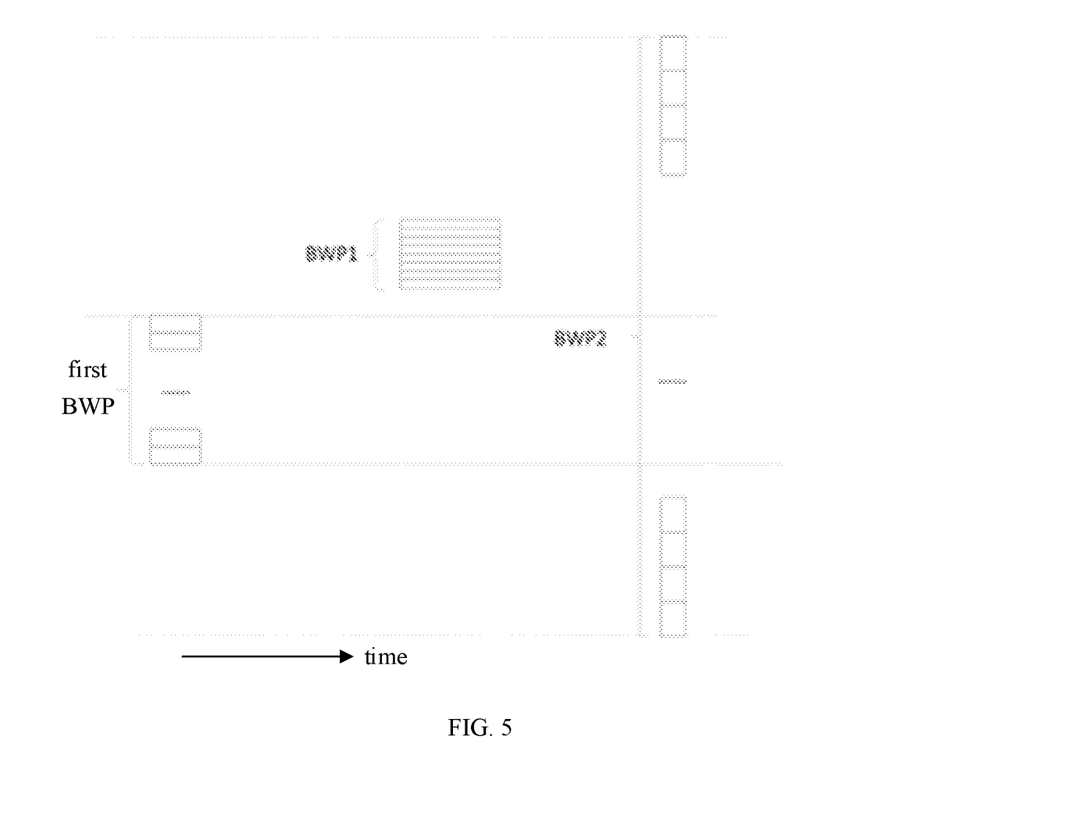
FIG. 5 is a schematic diagram showing a BWP configuration of a direct connection communication device according to one or more examples of the present disclosure.

In one example, it is assumed that there are two direct connection communication devices of different device types. Device 1 is a device with low energy consumption and low cost, and Device 2 is a device with a large data rate and low latency. Then Device 1 and Device 2 can determine the first direct connection communication BWP and the second direct connection communication BWP corresponding to itself respectively according to the base station configuration or pre-configuration, as shown in FIG. 5, for example.

The first direct connection communication BWP of Device 1 and Device 2 is the same, the second direct connection communication BWP of Device 1 is BWP1, which has lower subcarrier spacing and narrower bandwidth, and the second direct connection communication BWP of Device 2 is BWP2, which has higher subcarrier spacing and wider bandwidth.

Figure 6:
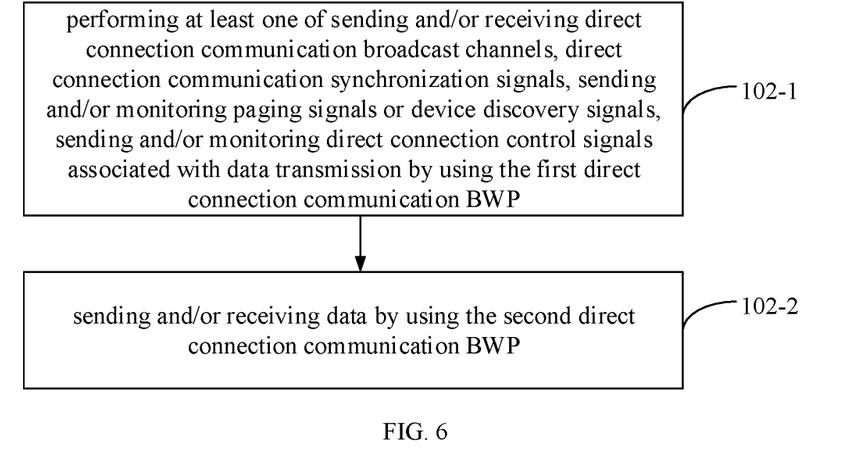
FIG. 6 is another schematic flowchart of a direct connection communication method according to one or more examples of the present disclosure.

In an example, referring to FIG. 6, FIG. 6 is another flowchart of a direct connection communication method according to the example shown in FIG. 1, and the step 102 may include following steps.

In step 102-1, at least one of sending and/or receiving direct connection communication broadcast channels, direct connection communication synchronization signals, sending and/or monitoring paging signals or device discovery signals, sending and/or monitoring direct connection control signals associated with data transmission is performed by using the first direct connection communication BWP.

In this step, the direct connection communication device can use the first direct connection communication BWP to send direct connection communication broadcast channels and direct connection communication synchronization signals, or receive direct connection communication broadcast channels and direct connection communication synchronization signals, so as to perform direct connection communication synchronization with other direct connection communication devices based on the direct connection communication broadcast channel and the direct connection communication synchronization signal.

The direct connection communication device can also send a paging signal or device discovery signal, or monitor the paging signals or device discovery signals sent by other direct connection communication devices, so as to directly communicate with other direct connection communication devices subsequently.

The direct connection communication device can also send or monitor the direct connection control signal associated with the data transmission, so as to determine the BWP used for subsequent direct connection communication. The direct connection notification signal may be a physical layer direct connection control signal or an RRC (Radio Resource Control) layer direct connection control signal.

For example, the direct connection communication device sends the physical layer direct connection control information on the first direct connection communication BWP, and the direct connection control information contains the information of the corresponding BWP used for data transmission; the other direct connection communication device receives the direct connection control information on the first direct connection communication BWP, and receives the direct connection data on the BWP indicated by the direct connection control information.

Through the above process, as for direct connection communication devices that perform a plurality of services at the same time, if different services use different BWPs, there is no need to monitor the direct connection control information on the BWPs corresponding to all services, and it only needs to monitor the direct connection control information on the first direct connection communication BWP, and switch to the corresponding BWP (i.e., the second direct connection communication BWP) in time to send or receive data, which can reduce the energy consumption and cost of monitoring of the user device.

For another example, as a unicast or multicast sender, a direct connection communication device sends the direct connection control information of the RRC layer on the first direct connection communication BWP, wherein the direct connection control information includes the BWP information used for unicast or multicast communication, and other direct connection communication devices serving as the receiving end also send connection establishment confirmation information on the first direct connection communication BWP after receiving the direct connection control information. Next, the direct connection communication device as the receiving end can perform unicast or multicast communication with the direct connection communication device as the sending end on the previously indicated BWP, and return to the first direct connection communication BWP for communication after the communication ends or after a period of communication.

In step 102-2, data is sent and/or received by using the second direct connection communication BWP.

In this step, the direct connection communication device may use the second direct connection communication BWP to perform at least one of data transmission and data reception.

In the above example, the direct connection communication device can perform at least one of sending and/or receiving direct connection communication broadcast channels, direct connection communication synchronization signals, sending and/or monitoring paging signals or device discovery signals, sending and/or monitoring direct connection control signals associated with data transmission by using the first direct connection communication BWP; send and/or receive data by using the second direct connection communication BWP. Through the above process, the direct connection communication device can use different direct connection communication BWPs in the direct connection communication BWP set to support different services, which improves the flexibility of direct connection communication and helps reduce device processing complexity and energy consumption of the device.

In one example, if direct connection communication devices that run a plurality of services at the same time need to send or receive a plurality of BWPs at the same time (for example, the same Ts, OFDM symbol, time slot, subframe, etc.), and the direct connection communication device does not support the simultaneous operation of the plurality of BWPs, the direct connection communication device can select the BWP corresponding to the service with the highest priority to send or receive according to the priority order of different services.

Where Ts is the most basic time unit in LTE (Long Term Evolution), which is 1/(15000×2048) seconds.

In an example, the first direct connection communication BWP and the second BWP of the direct connection device may use the same or different subcarrier spacing, frequency domain bandwidth, and/or frequency domain position, which has high availability.

Next, the direct connection communication method provided by the example of the present disclosure will be introduced from the base station side.

The example of the present disclosure also provides another flowchart of a direct connection communication method, which may be applied to a base station, and the method may include following step:

in step 201, sending a downlink control signaling to a direct connection communication device, and the direct connection communication device determining, according to the downlink control signaling, a first direct connection communication BWP and/or a second direct connection communication BWP in a direct connection communication BWP set for direct connection communication.

In this step, the base station can dynamically configure the first direct connection communication BWP and/or the second direct connection communication BWP in the direct connection communication BWP set for the direct connection communication device, and inform the direct connection communication device the configured first direct connection communication BWP and/or second direct connection communication BWP through the downlink control signaling.

In the above example, the base station may send downlink control signaling to the direct connection communication device, and the direct connection communication device determines the first direct connection communication BWP and/or the second direct connection communication BWP in the direct connection communication BWP set for direct connection communication according to the downlink control signaling, such that the base station dynamically configures the direct connection communication BWP set for the direct connection communication device, which improves the flexibility of direct connection communication.

In an example, the downlink control signaling can be used to indicate the first direct connection communication BWP and the second direct connection communication BWP at the same time. The base station can configure different direct connection communication BWPs through different downlink control signaling, where the first direct connection communication BWP can be configured for the direct connection communication device through the cell broadcast message, and the second direct connection communication BWP can be configured for the direct connection communication device through the downlink control information of the direct connection communication devices of different device types, which is easy to implement and has high availability.

Corresponding to the foregoing application function realization method examples, the present disclosure also provides examples of application function realization apparatus, and corresponding direct connection communication device and base station.

Figure 7:
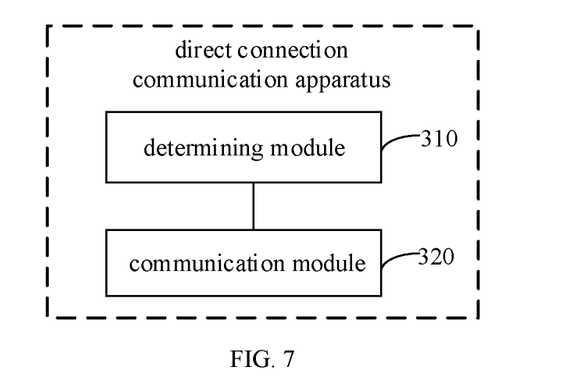
FIG. 7 is a block diagram showing a direct connection communication apparatus according to one or more examples of the present disclosure.

Referring to FIG. 7, FIG. 7 is a block diagram showing a direct connection communication apparatus according to an example. The apparatus is applied to a direct connection communication device and includes:

a determining module 310, configured to determine a direct connection communication Bandwidth Part (BWP) set, wherein the direct connection communication BWP set at least includes a first direct connection communication BWP and a second direct connection communication BWP; and a communication module 320, configured to perform direct connection communication by using the direct connection communication BWP set.

Figure 8:
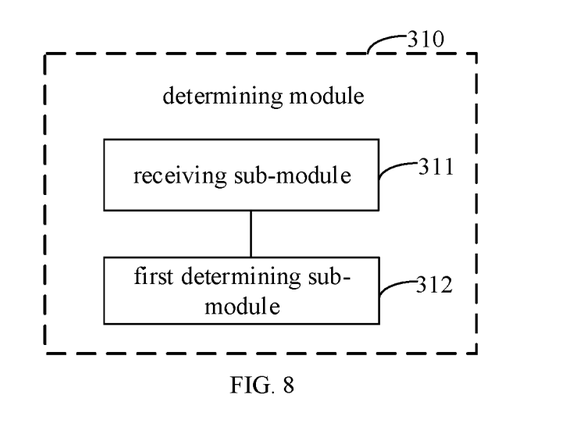
FIG. 8 is another block diagram showing a direct connection communication apparatus according to one or more examples of the present disclosure.

Referring to FIG. 8, FIG. 8 is another block diagram showing a direct connection communication apparatus based on the example shown in FIG. 7, and the determining module 310 includes:

a receiving sub-module 311, configured to receive a downlink control signaling sent by a base station, wherein the downlink control signaling is used to indicate the first direct connection communication BWP and/or the second direct connection communication BWP;

a first determining sub-module 312, configured to determine the direct connection communication BWP set according to the downlink control signaling.

Figure 9:
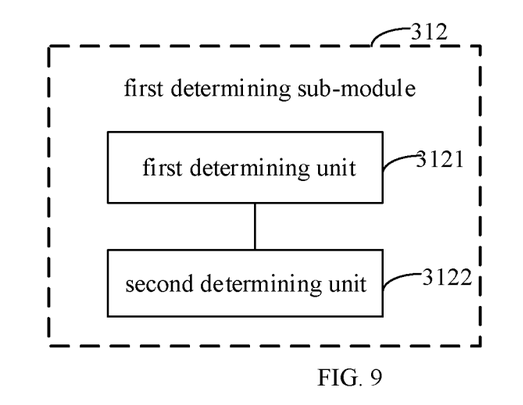
FIG. 9 is another block diagram showing a direct connection communication apparatus according to one or more examples of the present disclosure.

Referring to FIG. 9, FIG. 9 is another block diagram showing a direct connection communication apparatus based on the example shown in FIG. 8. The first determining sub-module 312 includes:

a first determining unit 3121, configured to determine the first direct connection communication BWP according to a cell broadcast message sent by the base station;

a second determining unit 3122, configured to determine the second direct connection communication BWP according to downlink control information for direct connection communication devices of different device types sent by the base station.

Figure 10:
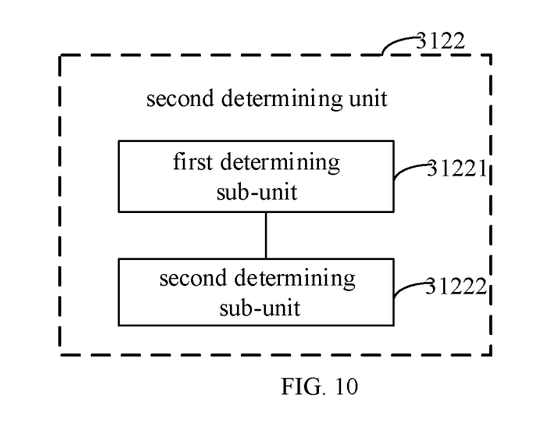
FIG. 10 is another block diagram showing a direct connection communication apparatus according to one or more examples of the present disclosure.

Referring to FIG. 10, FIG. 10 is another block diagram showing a direct connection communication apparatus based on the example shown in FIG. 9, and the second determining unit 3122 includes:

a first determining sub-unit 31221, configured to, among a plurality of BWPs configured by the base station for the direct connection communication devices of different device types indicated by the downlink control information, determine the BWP corresponding to the device type of the direct connection communication device according to a preset correspondence between the device type of the direct connection communication device and the BWP;

a second determining sub-unit 31222, configured to serve the BWP corresponding to the device type of the direct connection communication device as the second direct connection communication BWP.

Figure 11:
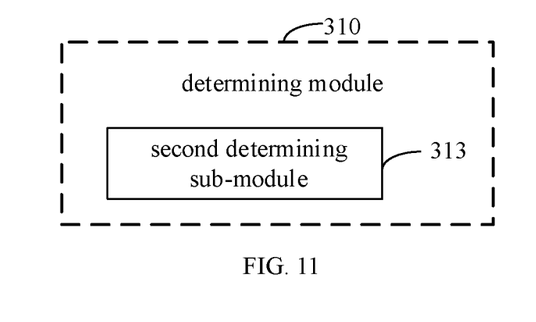
FIG. 11 is another block diagram showing a direct connection communication apparatus according to one or more examples of the present disclosure.

Referring to FIG. 11, FIG. 11 is another block diagram showing a direct connection communication apparatus based on the example shown in FIG. 7, and the determining module 310 includes:

a second determining sub-module 313, configured to determine the first direct connection communication BWP and/or the second direct connection communication BWP according to the BWP pre-configured for the direct connection communication device.

Figure 12:
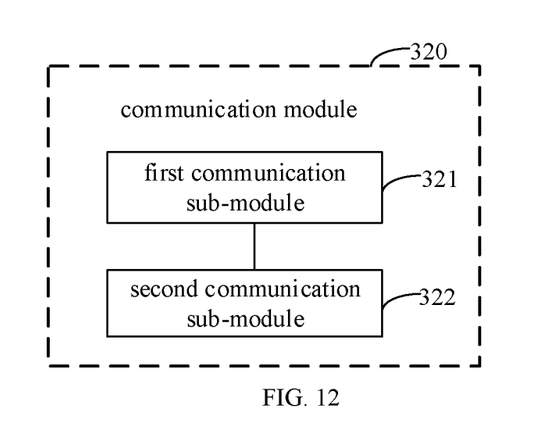
FIG. 12 is another block diagram showing a direct connection communication apparatus according to one or more examples of the present disclosure.

Referring to FIG. 12, FIG. 12 is another block diagram of a direct connection communication apparatus based on the example shown in FIG. 7. The communication module 320 includes:

a first communication sub-module 321, configured to perform at least one of sending and/or receiving direct connection communication broadcast channels, direct connection communication synchronization signals, sending and/or monitoring paging signals or device discovery signals, sending and/or monitoring direct connection control signals associated with data transmission by using the first direct connection communication BWP;

a second communication sub-module 322, configured to send and/or receive data by using the second direct connection communication BWP.

Optionally, the first direct connection communication BWP uses identical or different subcarrier spacing, frequency domain bandwidth and/or frequency domain position as the second direct connection communication BWP.

Figure 13:
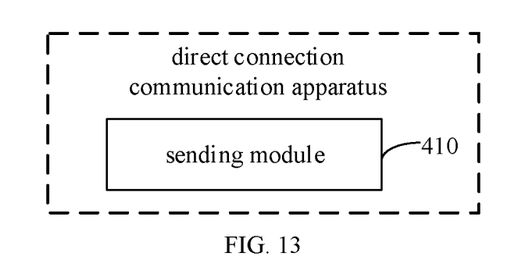
FIG. 13 is another block diagram showing a direct connection communication apparatus according to one or more examples of the present disclosure.

Referring to FIG. 13, FIG. 13 is another block diagram showing a direct connection communication apparatus according to an example. The apparatus is applied to a base station and includes:

a sending module 410, configured to send a downlink control signaling to a direct connection communication device, and the direct connection communication device determining, according to the downlink control signaling, a first direct connection communication BWP and/or a second direct connection communication BWP in a direct connection communication BWP set for direct connection communication.

Optionally, the downlink control signaling is used to indicate the first direct connection communication BWP and the second direct connection communication BWP, wherein the downlink control signaling includes a cell broadcast message used to indicate the first direct connection communication BWP and downlink control information for direct connection communication devices of different device types used to indicate the second direct connection communication BWP.

As for the apparatus examples, since they basically correspond to the method examples, the relevant part can refer to the description of the method examples. The apparatus examples described above are merely illustrative. The units described above as separate components may or may not be physically separated, and the components displayed as units may or may not be physical units, that is, they may be located in one place, or they may be distributed over multiple network units. Some or all of the modules can be selected according to actual needs to achieve the objectives of the solutions of the present disclosure. Those of ordinary skill in the art can understand and implement without creative work.

Correspondingly, the present disclosure also provides a computer-readable storage medium, the storage medium stores a computer program, and the computer program is used to execute any of the above-mentioned direct connection communication methods at the direct connection communication device side.

Correspondingly, the present disclosure also provides a computer-readable storage medium, the storage medium stores a computer program, and the computer program is used to execute any of the above-mentioned direct connection communication methods at the base station side.

Correspondingly, the present disclosure also provides a direct connection communication apparatus, applied to a direct connection communication device and including:

a processor; and a memory for storing instructions executable by the processor, wherein, the processor is configured to:

determine a direct connection communication Bandwidth Part (BWP) set, wherein the direct connection communication BWP set at least includes a first direct connection communication BWP and a second direct connection communication BWP; and perform direct connection communication by using the direct connection communication BWP set.

Figure 14:
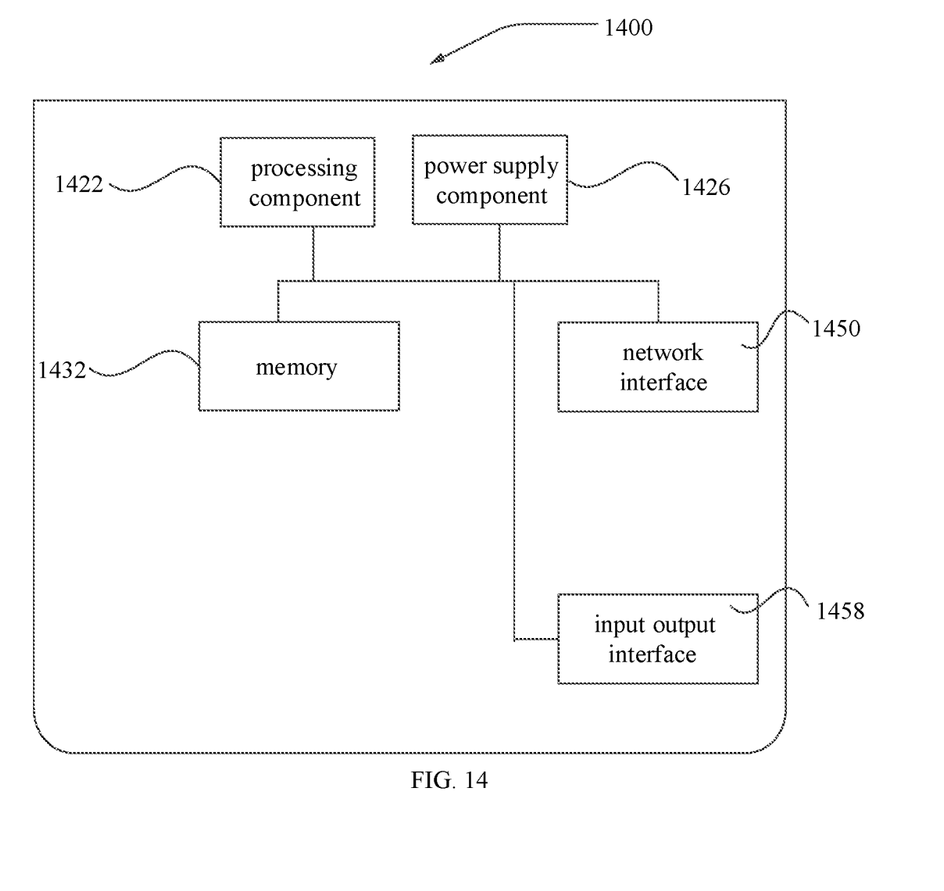
FIG. 14 is a schematic structural diagram of a direct connection communication apparatus according to one or more examples of the present disclosure.

As shown in FIG. 14, FIG. 14 is a schematic structural diagram of a direct connection communication apparatus 1400 according to an example. For example, the apparatus 1400 may be provided as a direct connection communication device. Referring to FIG. 14, the apparatus 1400 includes a processing component 1422, which further includes one or more processors, and memory resource represented by a memory 1432 for storing instructions executable by the processing component 1422, such as application programs. The application program stored in the memory 1432 may include one or more modules each corresponding to a set of instructions. In addition, the processing component 1422 is configured to execute instructions to execute the above-mentioned direct connection communication method.

The apparatus 1400 may also include a power supply component 1426 configured to perform power management of the apparatus 1400, a wired or wireless network interface 1450 configured to connect the apparatus 1400 to a network, and an input output (I/O) interface 1458. The apparatus 1400 can operate based on an operating system stored in the memory 1432, such as Android, IOS, Windows Server™, Mac OS X™, Unix™, Linux™, FreeBSD™ or the like.

When the instructions in the memory 1432 are executed by the processing component 1422, the apparatus 1400 can execute the above-mentioned direct connection communication method.

Correspondingly, the present disclosure also provides a direct connection communication apparatus, applied to a base station and including:

a processor; and a memory for storing instructions executable by the processor, wherein, the processor is configured to:

send a downlink control signaling to a direct connection communication device, and the direct connection communication device determining, according to the downlink control signaling, a first direct connection communication BWP and/or a second direct connection communication BWP in a direct connection communication BWP set for direct connection communication.

Figure 15:
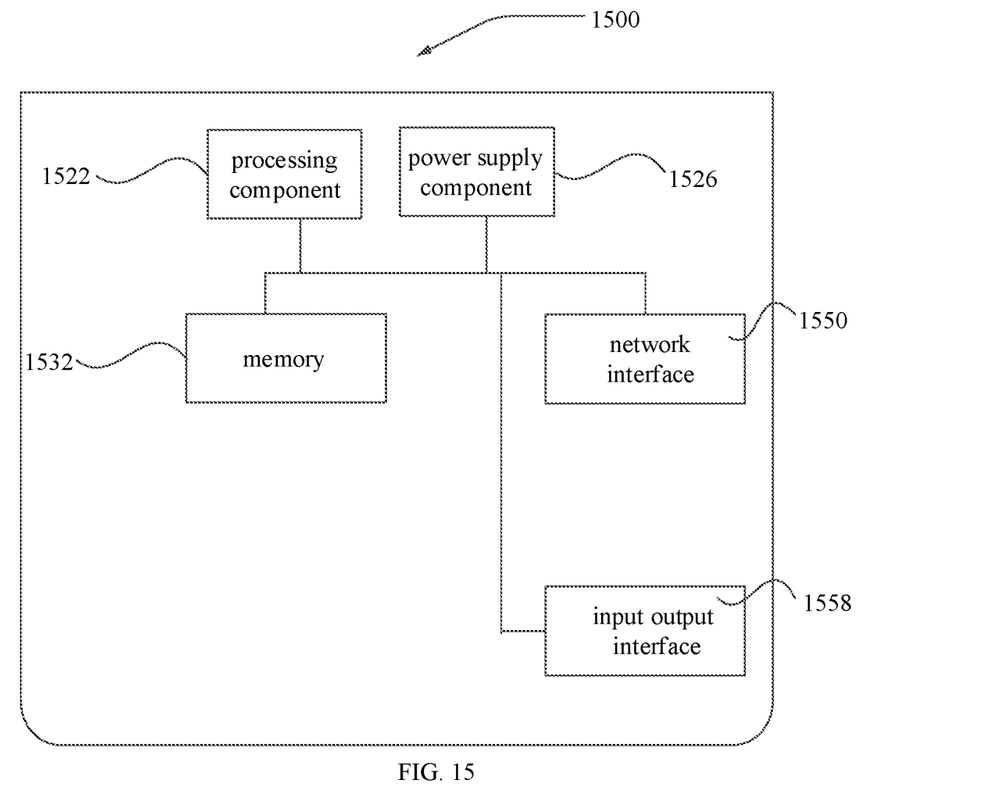
FIG. 15 is another schematic structural diagram of a direct connection communication apparatus according to one or more examples of the present disclosure.

As shown in FIG. 15, FIG. 15 is a schematic structural diagram of a direct connection communication apparatus 1500 according to an example. For example, the apparatus 1500 may be provided as a base station. Referring to FIG. 15, the apparatus 1500 includes a processing component 1522, which further includes one or more processors, and memory resource represented by a memory 1532 for storing instructions executable by the processing component 1522, such as application programs. The application program stored in the memory 1532 may include one or more modules each corresponding to a set of instructions. In addition, the processing component 1522 is configured to execute instructions to execute the above-mentioned direct connection communication method.

The apparatus 1500 may also include a power supply component 1526 configured to perform power management of the apparatus 1500, a wired or wireless network interface 1550 configured to connect the apparatus 1500 to a network, and an input output (I/O) interface 1558. The apparatus 1500 can operate based on an operating system stored in the memory 1532, such as Android, IOS, Windows Server™, Mac OS X™, Unix™, Linux™, FreeBSD™ or the like.

When the instructions in the memory 1532 are executed by the processing component 1522, the apparatus 1500 can execute the above-mentioned direct connection communication method.

Optionally, determining the direct connection communication BWP set includes:
  receiving a downlink control signaling sent by a base station, wherein the downlink control signaling is used to indicate the first direct connection communication BWP and/or the second direct connection communication BWP;
  determining the direct connection communication BWP set according to the downlink control signaling.

Optionally, determining the direct connection communication BWP set according to the downlink control signaling includes:
  determining the first direct connection communication BWP according to a cell broadcast message sent by the base station;
  determining the second direct connection communication BWP according to downlink control information for direct connection communication devices of different device types sent by the base station.

Optionally, determining the second direct connection communication BWP according to downlink control information for direct connection communication devices of different device types sent by the base station includes:
  among a plurality of BWPs configured by the base station for the direct connection communication devices of different device types indicated by the downlink control information, determining the BWP corresponding to the device type of the direct connection communication device according to a preset correspondence between the device type of the direct connection communication device and the BWP;
  serving the BWP corresponding to the device type of the direct connection communication device as the second direct connection communication BWP.

Optionally, determining the direct connection communication BWP set includes:
  determining the first direct connection communication BWP and/or the second direct connection communication BWP according to the BWP pre-configured for the direct connection communication device.

Optionally, performing direct connection communication by using the direct connection communication BWP set includes:
  performing at least one of sending and/or receiving direct connection communication broadcast channels, direct connection communication synchronization signals, sending and/or monitoring paging signals or device discovery signals, sending and/or monitoring direct connection control signals associated with data transmission by using the first direct connection communication BWP;
  sending and/or receiving data by using the second direct connection communication BWP.

Optionally, the first direct connection communication BWP uses identical or different subcarrier spacing, frequency domain bandwidth and/or frequency domain position as the second direct connection communication BWP.

Optionally, the downlink control signaling is used to indicate the first direct connection communication BWP and the second direct connection communication BWP, wherein the downlink control signaling includes a cell broadcast message used to indicate the first direct connection communication BWP and downlink control information for direct connection communication devices of different device types used to indicate the second direct connection communication BWP.

Optionally, the determining module includes:
  a receiving sub-module, configured to receive a downlink control signaling sent by a base station, wherein the downlink control signaling is used to indicate the first direct connection communication BWP and/or the second direct connection communication BWP;
  a first determining sub-module, configured to determine the direct connection communication BWP set according to the downlink control signaling.

Optionally, the first determining sub-module includes:
  a first determining unit, configured to determine the first direct connection communication BWP according to a cell broadcast message sent by the base station;
  a second determining unit, configured to determine the second direct connection communication BWP according to downlink control information for direct connection communication devices of different device types sent by the base station.

Optionally, the second determining unit includes:
  a first determining sub-unit, configured to, among a plurality of BWPs configured by the base station for the direct connection communication devices of different device types indicated by the downlink control information, determine the BWP corresponding to the device type of the direct connection communication device according to a preset correspondence between the device type of the direct connection communication device and the BWP;
  a second determining sub-unit, configured to serve the BWP corresponding to the device type of the direct connection communication device as the second direct connection communication BWP.

Optionally, the determining module includes:
  a second determining sub-module, configured to determine the first direct connection communication BWP and/or the second direct connection communication BWP according to the BWP pre-configured for the direct connection communication device.

Optionally, the communication module includes:
  a first communication sub-module, configured to perform at least one of sending and/or receiving direct connection communication broadcast channels, direct connection communication synchronization signals, sending and/or monitoring paging signals or device discovery signals, sending and/or monitoring direct connection control signals associated with data transmission by using the first direct connection communication BWP;
  a second communication sub-module, configured to send and/or receive data by using the second direct connection communication BWP.

Optionally, the first direct connection communication BWP uses identical or different subcarrier spacing, frequency domain bandwidth and/or frequency domain position as the second direct connection communication BWP.

According to a fourth aspect of the present disclosure, there is provided a direct connection communication apparatus, applied to a base station and including: a sending module, configured to send a downlink control signaling to a direct connection communication device, and the direct connection communication device determining, according to the downlink control signaling, a first direct connection communication BWP and/or a second direct connection communication BWP in a direct connection communication BWP set for direct connection communication.

Optionally, the downlink control signaling is used to indicate the first direct connection communication BWP and the second direct connection communication BWP, wherein the downlink control signaling includes a cell broadcast message used to indicate the first direct connection communication BWP and downlink control information for direct connection communication devices of different device types used to indicate the second direct connection communication BWP.

According to a fifth aspect of the present disclosure, there is provided a computer-readable storage medium, wherein the storage medium stores a computer program, and the computer program is used to execute the direct connection communication method according to the first aspect.

According to a sixth aspect of the present disclosure, there is provided a computer-readable storage medium, wherein the storage medium stores a computer program, and the computer program is used to execute the direct connection communication method according to the second aspect.

According to a seventh aspect of the present disclosure, there is provided a direct connection communication apparatus, applied to a direct connection communication device and including: a processor; and a memory for storing instructions executable by the processor.

The processor is configured to: determine a direct connection communication Bandwidth Part (BWP) set, wherein the direct connection communication BWP set at least includes a first direct connection communication BWP and a second direct connection communication BWP; and perform direct connection communication by using the direct connection communication BWP set.

According to an eighth aspect of the present disclosure, there is provided a direct connection communication apparatus, applied to a base station and including: a processor; and a memory for storing instructions executable by the processor, where the processor is configured to: send a downlink control signaling to a direct connection communication device, and the direct connection communication device determining, according to the downlink control signaling, a first direct connection communication BWP and/or a second direct connection communication BWP in a direct connection communication BWP set for direct connection communication.

Other examples of the disclosure will be apparent to those skilled in the art from consideration of the specification and practice of the disclosure disclosed here. This disclosure is intended to cover any variations, uses, or adaptations of the disclosure following the general principles thereof and including known knowledge or conventional technical means in the art not disclosed in the present disclosure. It is intended that the specification and examples are considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A direct connection communication method, comprising:

determining, by a direct connection communication device, a direct connection communication Bandwidth Part (BWP) set, wherein the direct connection communication BWP set at least comprises a first direct connection communication BWP and a second direct connection communication BWP; and performing, by the direct connection communication device, direct connection communication by using the direct connection communication BWP set, wherein determining the direct connection communication BWP set comprises:

determining the first direct connection communication BWP or the second direct connection communication BWP according to BWP pre-configured for the direct connection communication device.

2. The method according to claim 1, wherein determining the direct connection communication BWP set comprises:

receiving a downlink control signaling sent by a base station, wherein the downlink control signaling indicates the first direct connection communication BWP or the second direct connection communication BWP; and determining the direct connection communication BWP set according to the downlink control signaling.

3. The method according to claim 2, wherein determining the direct connection communication BWP set according to the downlink control signaling comprises:

determining the first direct connection communication BWP according to a cell broadcast message sent by the base station; and determining the second direct connection communication BWP according to downlink control information for direct connection communication devices of different device types sent by the base station.

4. The method according to claim 3, wherein determining the second direct connection communication BWP according to downlink control information for direct connection communication devices of different device types sent by the base station comprises:

among a plurality of BWPs configured by the base station for the direct connection communication devices of different device types indicated by the downlink control information, determining the BWP corresponding to a device type of the direct connection communication device according to a preset correspondence between the device type of the direct connection communication device and the BWP; and serving the BWP corresponding to the device type of the direct connection communication device as the second direct connection communication BWP.

5. The method according to claim 1, wherein performing direct connection communication by using the direct connection communication BWP set comprises:

performing at least one of sending or receiving direct connection communication broadcast channels, direct connection communication synchronization signals, sending or monitoring paging signals or device discovery signals, sending or monitoring direct connection control signals associated with data transmission by using the first direct connection communication BWP; and sending or receiving data by using the second direct connection communication BWP.

6. The method according to claim 1, wherein the first direct connection communication BWP uses identical or different subcarrier spacing, frequency domain bandwidth or frequency domain position as the second direct connection communication BWP.

7. A direct connection communication method, comprising:
sending, by a base station, a downlink control signaling to a direct connection communication device, and the direct connection communication device determining, according to the downlink control signaling, a first direct connection communication BWP or a second direct connection communication BWP in a direct connection communication BWP set for direct connection communication,
wherein the downlink control signaling indicates the first direct connection communication BWP and the second direct connection communication BWP, wherein the downlink control signaling comprises a cell broadcast message configured to indicate the first direct connection communication BWP and downlink control information for direct connection communication devices of different device types configured to indicate the second direct connection communication BWP.

8. A direct connection communication device, comprising:
a processor; and
a memory for storing instructions executable by the processor,
wherein, the processor is configured to:
determine a direct connection communication Bandwidth Part (BWP) set, wherein the direct connection communication BWP set at least comprises a first direct connection communication BWP and a second direct connection communication BWP; and
perform direct connection communication by using the direct connection communication BWP set,
wherein the processor is further configured to:
determine the first direct connection communication BWP or the second direct connection communication BWP according to the BWP pre-configured for the direct connection communication device.

9. The direct connection communication device according to claim 8, wherein the processor is further configured to:
receive a downlink control signaling sent by a base station, wherein the downlink control signaling indicates the first direct connection communication BWP or the second direct connection communication BWP; and
determine the direct connection communication BWP set according to the downlink control signaling.

10. The direct connection communication device according to claim 9, wherein the processor is further configured to:
determine the first direct connection communication BWP according to a cell broadcast message sent by the base station; and
determine the second direct connection communication BWP according to downlink control information for direct connection communication devices of different device types sent by the base station.

11. The direct connection communication device according to claim 10, wherein the processor is further configured to:
among a plurality of BWPs configured by the base station for the direct connection communication devices of different device types indicated by the downlink control information, determine the BWP corresponding to a device type of the direct connection communication device according to a preset correspondence between the device type of the direct connection communication device and the BWP; and
serve the BWP corresponding to the device type of the direct connection communication device as the second direct connection communication BWP.

12. The direct connection communication device according to claim 8, wherein the processor is further configured to:
perform at least one of sending or receiving direct connection communication broadcast channels, direct connection communication synchronization signals, sending or monitoring paging signals or device discovery signals, sending or monitoring direct connection control signals associated with data transmission by using the first direct connection communication BWP; and
send or receive data by using the second direct connection communication BWP.

13. The direct connection communication device according to claim 8, wherein the first direct connection communication BWP uses identical or different subcarrier spacing, frequency domain bandwidth or frequency domain position as the second direct connection communication BWP.

14. A non-transitory computer-readable storage medium, wherein the storage medium stores a computer program, and the computer program is configured to execute the direct connection communication method according to claim 1.

15. A non-transitory computer-readable storage medium, wherein the storage medium stores a computer program, and the computer program is configured to execute the direct connection communication method according to claim 7.

* * * * *